Jan. 6, 1942. B. CLAYTON Re. 21,992

REFINING OF ANIMAL AND VEGETABLE OILS

Original Filed Sept. 26, 1939

Inventor
Benjamin Clayton

By Harris, Kiech, Foster & Harris
Attorneys

Reissued Jan. 6, 1942

Re. 21,992

UNITED STATES PATENT OFFICE 21,992

REFINING OF ANIMAL AND VEGETABLE OILS

Benjamin Clayton, Houston, Tex., assignor to Refining, Inc., Reno, Nev., a corporation of Nevada Original No. 2,249,701, dated July 15, 1941, Serial No. 296,685, September 26, 1939. Application for reissue October 31, 1941, Serial No. 417,413

13 Claims. (Cl. 260—425)

Figures 1, 2:
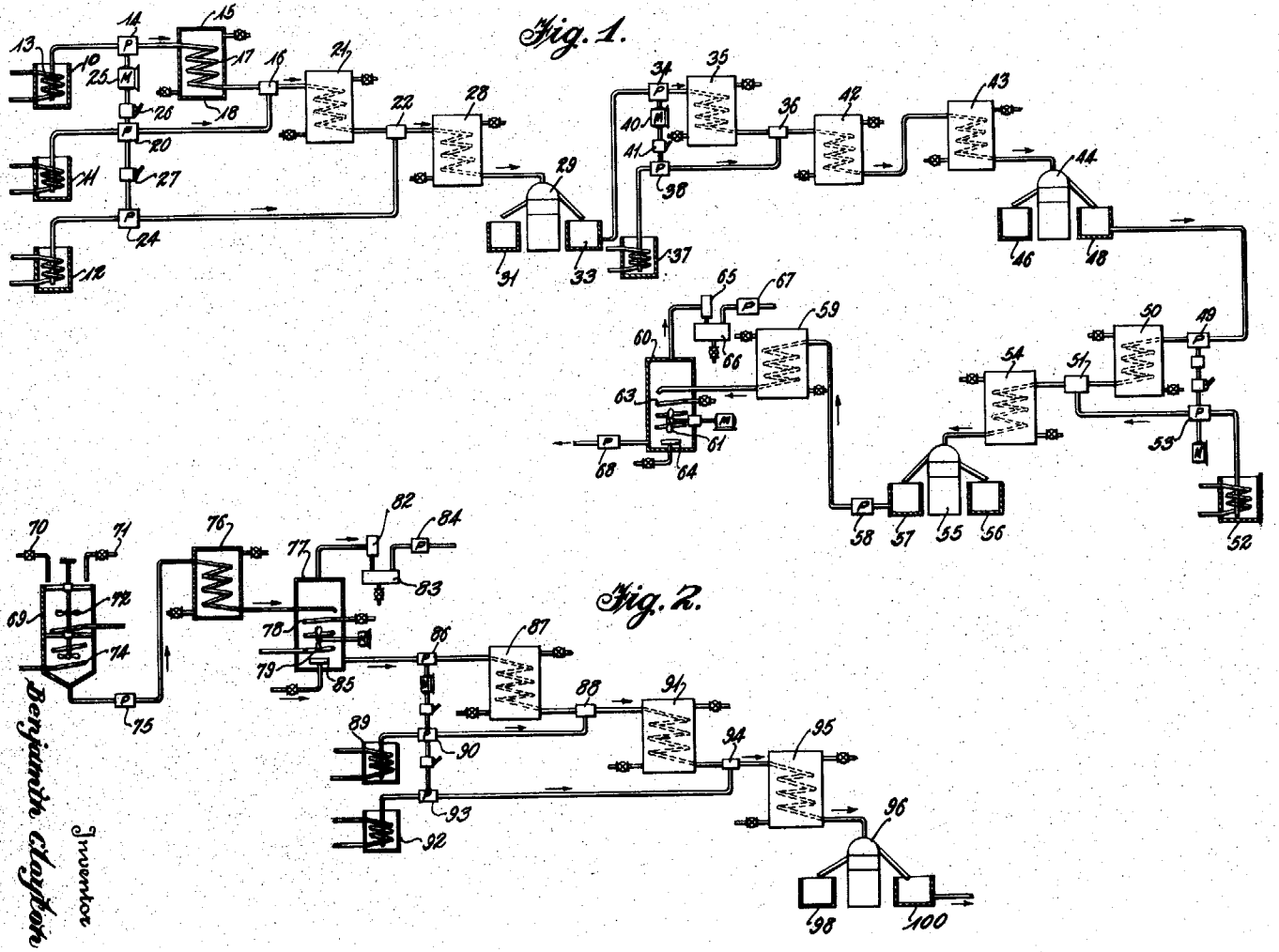

This invention relates to a process of refining or partially refining animal and vegetable oils.

Caustic alkalies in amounts providing large excesses have been conventionally employed in the complete alkali refining of animal and vegetable oils to neutralize the free fatty acids thereof and form separable soap stock. Such excesses of caustic alkalies saponify neutral oil to produce refining losses. Also, substantial amounts of neutral oil are lost by entrainment in the soap stock when this soap stock is separated from the oil. The employment of caustic alkalies in excess as the neutralizing agent has been considered necessary for complete refining in order to produce a separable soap stock and also in order to reduce the color of certain oils.

In accordance with the present invention, it has been found that non-saponifying neutralizing agents may be employed for complete refining so as to substantially eliminate losses by saponification of neutral oil and also that the proper employment of softening or diluting agents for soap stock or other foots provides efficient separation of the soap stock from the oil and reduces entrainment of neutral oil. The present invention also contemplates a partial or complete dehydration step after adding the refining agent, which step is preferably followed by a rehydration step prior to separation. Certain of the steps of the present invention may be employed in combination with the use of caustic alkalies as neutralizing reagents to reduce refining losses, even if the conventional excesses of such caustic alkalies are employed. The present invention also enables lower excesses or no excess of caustic alkalies to be employed in the neutralization step so as to reduce or eliminate losses due to saponification of neutral oil while still providing effective separation of the soap stock and adequate color reduction. Furthermore, certain steps of the present invention are effective to reduce refining losses in acid refining processes or in partial refining or degumming operations employed to condition the oil for more effective alkali refining or for the production of non-break oil.

The object of the present invention is to provide a process of refining or partially refining vegetable and animal oils in which refining losses are markedly reduced.

In describing the present invention, reference will be had to the accompanying drawing of which:

Figure 1 is a schematic diagram of apparatus in which the process of the present invention may be performed; and Figure 2 is a similar diagram of a modified apparatus.

Referring more particularly to Figure 1: 10 indicates a tank for oil to be refined, 11 indicates a tank which may contain either a refining agent or a diluting or softening agent for the soap stock or other foots, and 12 indicates a tank for an additional refining or other agent. The oil may be brought to a predetermined temperature by a heating coil 13 positioned in the tank 10, and may be withdrawn from the tank by a pump 14 and passed through a heat exchange device 15 to a flow mixer 16. The heat exchange device may include a coil 17 through which the oil is passed, which coil is positioned in a casing 18 through which any desired heating medium may be circulated. Neutralizing or other refining agent may be heated in the tank 11, withdrawn by a pump 20 and delivered to the flow mixer 16. The flow mixer 16 may be of any desired type of closed mixing device such as a closed mechanical agitator or colloid mill. In many cases the mixer may merely be a means for injecting a flowing stream of the agent into a flowing stream of the oil.

The mixture of oil and agent may be passed through a second heat exchange device 21, and then delivered to a second flow mixer 22. Additional agent may be brought to a desired mixing temperature in the tank 12, withdrawn by a pump 24 and delivered to the flow mixer 22. For alkali refining, at least one of the agents added in the mixers 16 or 22 contains sufficient neutralizing agent to neutralize the free fatty acids and form soap stock. The pumps 14, 20 and 24 are preferably arranged to deliver accurately proportioned streams of the various materials. One way of accomplishing this is to drive the pumps by a variable speed electric motor 25 with variable speed devices 26 and 27 positioned between the motor and the pumps 20 and 24. The resulting mixture may be passed through another heat exchange device 28 and delivered to a continuous centrifugal separator 29. The soap stock is discharged from the centrifugal separator as a liquid heavy effluent into a receiver 31. Neutralized oil is discharged as the light effluent into a receiver 33. If the neutralized oil is too highly colored, it may be withdrawn from the receiver 33 by a pump 34 and passed through a heat exchange device 35 to a flow mixer 36. A color reducing agent heated to a desired temperature may be withdrawn from a tank 37 by a pump 38 and delivered to the flow mixer 36. Pumps 34 and 38 may also be arranged to deliver accurately proportioned streams by driving the pumps with a variable speed electric motor 40 and providing a variable speed device 41 between the motor 40 and the pump 38. The mixture of oil and color reducing agent may then be passed through one or more heat exchange devices 42 and 43 and delivered to a continuous centrifugal separator 44 in which the color impurities are separated from the oil and discharged as the heavy effluent into a receiver 46. The oil is discharged as the light effluent into a receiver 48. The color reduction step may be omitted if the color of the neutralized oil in the receiver 33 is sufficiently low and is not ordinarily employed with acid refining or partial refining.

Following alkali or acid refining, the oil discharged into the receiver 48, or, if the color reduction step is omitted, the oil discharged into the receiver 33, is desirably washed and vacuum dried by withdrawing a stream of the oil by a pump 49, passing the same through a heat exchanger 50 to bring the oil to a desired mixing temperature, which is usually between 120 and 200° F., and delivering the stream into a flow mixer 51. A stream of water heated to the desired mixing temperature may be withdrawn from a tank 52 by a pump 53 and delivered to the mixer 51, in amounts ranging between 5 and 30% of the oil and usually about 15%. The resulting mixture may then be passed through a heat exchanger 54 and delivered to a continuous centrifugal separator 55. The temperature for most effective separation ordinarily ranges between 140 and 200° F. The water containing dissolved impurities is discharged as the heavier effluent into a receiver 56 and the washed oil is discharged as the light effluent into a receiver 57. The washed oil may then be withdrawn from the receiver 57 by a pump 58, passed through a heat exchanger 59 and delivered into a vacuum chamber 60 at a temperature which is preferably between 160 and 210° F. The vacuum chamber is preferably provided with an agitator 61 and with a heating coil 63. It may also be provided with a steam distributor 64 so that steam, preferably superheated, may be introduced to agitate the oil and assist in carrying off water and other vapors. Vapors may be withdrawn from the vacuum chamber into a condenser 65 provided with a receiver 66, by a vacuum pump 67. A relatively high vacuum, for example between 27 and 29 inches of mercury, is preferably maintained in the vacuum chamber. Temperatures in the vacuum chamber will usually range between 160 and 200° F. for drying the oil, although the temperature may be increased up to 350° F. and the oil treated with superheated steam in order to deodorize the oil. The washed and dried oil may be removed from the vacuum chamber and discharged from the process by a pump 68.

Non-saponifying neutralizing agents, that is, agents which will not saponify neutral oil but which will react with free fatty acids present in the oil to form separable reaction products, are particularly useful in the process of the present invention for complete refining, although caustic alkalies can also be employed as the neutralizing agent under certain conditions, as described hereinafter. Soda ash is a preferred non-saponifying neutralizing agent and the operation of the process carried out in accordance with Figure 1 will be first described with reference thereto. When thoroughly admixed with oils containing free fatty acids, an aqueous soda ash solution in proper amounts and concentration will substantially completely neutralize the free fatty acids. Formation of carbon dioxide may take place so as to interfere with separation unless the amount of soda ash admixed with the oil is at least twice and preferably three times as great as that necessary to neutralize the free fatty acids. However, the avoidance of carbon dioxide formation is not the only reason for employing a large excess of soda ash solution. Non-saponifying alkalies, in general, when employed in amounts chemically equivalent to the free fatty acids or with the excess conventionally employed in caustic refining, produce difficultly separable soap stock, that is, soap stock which is finely divided, light in weight, having poor flowing properties, and either separating with the oil or entraining a large amount of oil. It has been found that the presence of large amounts of soda ash or equivalent solution of proper concentration in the mixture during centrifugal separation of the soap stock from the oil will soften the soap stock and provide for efficient separation. When employing soda ash to facilitate separation, the concentration of the soda ash solution present during separation usually ranges between 12 and 20° Bé., but with some oils may be as low as 5° Bé. and with other oils as great as 30° Bé. The amount of soda ash necessary for effective separation will usually range between seven and twelve times that necessary to neutralize the free fatty acids, but with some other oils may be as low as three times that necessary for neutralization.

All of the soda ash solution necessary to provide for effective separation may sometimes be introduced into the mixer 16, in which case the mixer 22, heat exchanger 28, tank 12 and pump 24 may be eliminated. Better results are obtained with other oils by admixing a portion of the soda ash solution in the mixer 16 and a portion in the mixer 22. If more than one addition of soda ash solution is employed, the concentrations of the two solutions may be different so long as the resulting solution present in the mixture during centrifugal separation is that found most effective for the particular oil being treated. Thus it has been found preferable with some oils to employ extremely concentrated soda ash solutions in the mixer 16 and add dilute solutions in the mixer 22. If the solution added to the mixer 16 is of sufficient concentration, it may be possible to add water alone in the mixer 22. Even dry soda ash may be added in the mixer 16 if this mixer is provided with a screw conveyor or other mechanism capable of adding proportioned amounts of dry soda ash. Alternatively, other oils respond to a treatment in which dilute solutions of soda ash or even water alone are added in the mixer 16 and concentrated or dry soda ash added in the mixer 22. With some oils, the initial addition of very dilute solutions of soda ash, for example 5° Bé. or less, are found to modify the gums so that effective separation is accomplished even if the total amount of soda ash solution or solution of other softening agent is reduced during separation. In any event, the concentration and amount of soda ash solution present during centrifugal separation must be sufficient to minimize or prevent gassing in the separator and sufficient to dilute and soften the soap stock so as to produce an easily flowable liquid soap stock.

The heating coil 13 in the tank 10 may be employed to supply all or a portion of the heat required in the process to cause effective separation. It is usually employed to bring the oil to a predetermined temperature and render viscous or solid oils easily flowable. It is not usually desirable to heat the oil in the large tank 10 much above 100° F., as subjecting the oil to higher temperatures for extended periods of time may damage the oil and set the color of highly colored oil. The heat exchange device 15 may be employed to heat the oil to an elevated temperature, for example, between 100 and 210° F., such that no additional heat need be added to the mixture and the heat exchange devices 21 and 22 can be omitted or employed to provide additional treating time between the oil and neutralizing agent or for smoothing out pulsations of the pumps 20 and 24. With certain oils best results are secured by thus preheating the oil, but with other oils it has been found preferable to introduce the oil into the mixer 16 at lower temperatures, for example temperatures between 70 and 100° F., in which case the heat exchanger 15 can be omitted. Additional heat may then be supplied to the mixture in either of the heat exchange devices 21 or 28, or both. Separation of the soap stock from the oil is preferably carried on at relatively high temperatures, for example temperatures between 160 and 210° F., although with some oils temperatures as low as 100° F. may be employed. These high temperatures may be employed with non-saponifying alkalies without danger of saponifying neutral oil. It is preferred to employ centrifugal separators of the heated type such as those disclosed in U. S. Patent No. 2,100,277 in order to impart at least a portion of the heat to the mixture within the separators. The high temperatures referred to, still further soften the soap and gums contained in the soap stock so that extremely effective separation can be accomplished. The large excess of soda ash minimizes or prevents the formation of carbon dioxide in the separator even at high temperatures. At the lower temperatures of separation, three times the amount of soda ash necessary to neutralize the free fatty acids will usually prevent formation of carbon dioxide in the separator, but with the higher temperatures it may be necessary to employ as much as seven times that amount.

The large amount of solution employed markedly reduces the color of the oil even in the absence of caustic alkalies. If the oil is still too highly colored, the color may be further reduced by admixing a caustic alkali such as caustic soda or caustic potash with the oil and centrifugally separating the color impurities from the oil. As the color reduction reaction appears to go forward more rapidly at a relatively low temperature, the oil may be cooled in the heat exchange device 35 to a temperature below that at which it is discharged from the separator 29. The most effective temperature for color reduction will vary with different oils, but will usually range between 70 and 120° F. The amount of caustic alkali necessary for reducing color will ordinarily vary between ½ and 4% of a 12° Bé. solution. The concentration of the color reducing agent will ordinarily be approximately 12° Bé. but may vary between 8 and 50° Bé. The heat exchanger 42 may be employed to provide a time of treatment between the color reducing agent and oil at the low temperature, although this treatment may not be necessary with certain oils, and will rarely exceed five minutes. As the most effective temperature of separation of the color impurities will range usually between 120° and 180° F., the heat exchanger 43 may be employed to rapidly increase the temperature of the mixture so that effective separation may be accomplished.

With certain oils which are resistant to decolorization or are very highly colored, for example, Brazilian or West Texas cottonseed oils, it is sometimes necessary to employ caustic solutions in excess of 12° Bé., for example, 20° Bé. or greater. Such high concentrations with these oils may cause fractionation or stratification of the mixture in the separator for the color impurities and contamination of the oil effluent with soap. This fractionation may be avoided while still securing adequate color reduction by mixing a stream of water with the mixture after the low temperature treatment with the caustic solution and just prior to heating the mixture for separation. It has been found that the addition of enough water to reduce the concentration of the caustic to approximately 8° Bé. enables efficient separation to be carried out. The color impurities and excess caustic solution discharge continuously as a thin trickle of dark liquor and a clear oil effluent is produced. With certain other oils requiring caustic solutions having concentrations as great as 14° Bé. for effective color reduction, no dilution has been found necessary for effective separation.

In addition to employing more highly concentrated decolorizing solutions, certain oils may require a greater time of treatment with the decolorizing agent at the low temperature, for example, 10 to 30 minutes or longer. This can be accomplished by employing a greater number of coils in series but is preferably accomplished by mixing a stream of the cooled oil with a stream of decolorizing agent and then continuously delivering the resulting stream of mixture into an agitating tank where it is subjected to agitation for the requisite time at a temperature between 70 and 100° F., the agitation being just sufficient to maintain a uniform mixture. A stream of the mixture may be continuously withdrawn from the agitating tank, heated in a coil to a separation temperature, for example 150° F., and centrifugally separated. Sufficient water to prevent stratification in the separator can be added as a stream of hot water to the stream of mixture either before or after the mixture is passed through the heating coil. Instead of caustic soda, other decolorizing agents such as sodium peroxide, sodium persulfate, sodium perborate, equivalent potassium compounds, as well as hydrogen peroxide, and caustic potash, or various mixtures of these materials may be employed. Any of these materials may also be employed in admixture with caustic soda.

While continuous flow mixing of the oil and agents under pressure and out of contact with the air is preferred, it is possible to mix a body of oil with a soda ash solution in a mixing receptacle such as shown in Figure 2, as the soda ash will not saponify neutral oil even upon prolonged contact. Thus, oil can be introduced into a receptacle 69 through a pipe 70 and soda ash solution introduced through the pipe 71. The receptacle may be provided with an agitator 72 driven from any suitable source of power so that a thorough admixture of the oil and neutralizing agent can be produced. The receptacle may also be provided with a heating coil 74 for heating the mixture during or subsequent to mixing. The mixture of oil and resulting soap stock may be withdrawn from the receptacle by a pump 75 and passed through a heat exchange device 76. The mixture may then be introduced into a vacuum chamber 77 provided with a heating coil 78 and an agitator 79. With some oils it has been found preferable to substantially completely dehydrate the mixture in the vacuum chamber by withdrawing water vapors into a condenser 82 in which the water is condensed and delivered as liquid water to a receiver 83. However, with other oils it has been found sufficient to merely remove gaseous materials such as air and carbon dioxide while removing only a portion of the water. The employment of very dilute solutions of soda ash in conjunction with dehydration is particularly effective with some oils, as the dilute solution modifies the gums to produce more effective separation and the dehydrator may be employed to bring the water content of the mixture to that producing most effective separation. The solution initially added may even be sufficiently dilute that neutralization does not take place until after partial dehydration. A vacuum pump 84 may be connected to the receiver to maintain a vacuum in the vacuum chamber. The vacuum chamber may also be provided with a steam distributor 85 through which steam, preferably superheated, may be introduced into the oil to assist in carrying off the vapors and agitating the oil.

A dehydrated or partially dehydrated mixture of oil and soap stock may be withdrawn from the vacuum chamber by a pump 86 and passed through a heat exchanger 87 into a mixer 88. If the mixture of oil and soap stock withdrawn from the vacuum chamber contains less water or soap stock softening agent than that providing effective separation, it may be rendered separable by admixing therewith a stream of rehydrating or diluting agent withdrawn from a tank 89 by a pump 90 and delivered to the mixer 88. The preferred rehydrating agent is an aqueous solution of soda ash, although other agents may be employed as hereinafter described. The rehydrated mixture may then be passed through another heat exchange device 91. If desired, additional rehydrating agent of the same or different kind of concentration may be withdrawn from a tank 92 by a pump 93 and delivered into a mixer 94, into which the mixture from the heat exchange device 91 may also be delivered. The resulting mixture may then be passed through another heat exchange device 95 and delivered to a continuous centrifugal separator 96. With certain oils sufficient rehydrating agent of the correct concentration may be introduced into the mixer 88 so that the mixer 94 and heat exchange device 95 may be eliminated. If sufficient soda ash or other agent was admixed with the oil prior to dehydration, the rehydrating agent may be water alone. In any case, the amount and concentration of soda ash or other solution present during separation in the separator 96 will be similar to the amount specified with reference to the process of Figure 1, although the dehydration treatment will usually enable a lesser amount to be employed. Thin liquid soap stock is separated from the refined oil and discharged as the heavy effluent into a receiver 98 and neutralized oil is discharged as the light effluent into a receiver 100. If necessary, for further color reduction, the oil may be withdrawn from the receiver 100 and subjected to a color reduction step similar to that described with reference to Figure 1, after which it may be washed and dried or, if the color of the oil is sufficiently low, it may be immediately subjected to a washing and drying step.

In carrying out the process of Figure 2, the oil in the mixing receptacle 69 is usually maintained at a relatively low temperature, for example, temperatures between 70 and 100° F., as heating the oil prior to admixing with neutralizing agent to a temperature much above 100° F. may damage the oil. Sufficient soda ash or other non-saponifying neutralizing agent is preferably introduced into the receptacle to neutralize the free fatty acids. When employing soda ash, it will in some cases be necessary to add at least twice as much soda ash as that necessary to neutralize the free fatty acids in order to prevent violent foaming in the receptacle. This is particularly true if the mixture is heated in the receptacle. By employing a large excess of soda ash, or very dilute solutions thereof, the mixture may be heated to relatively high temperatures, for example 120 to 140° F., in the receptacle without excessive foaming. The materials in the tank 69 are preferably agitated at a relatively high speed until a thorough admixture is obtained. The agitation may then be slowed and a stream of the mixture withdrawn from the receptacle by the pump 75. It is usually desirable to employ the heat exchanger 76 to increase the temperature of the mixture to between 160 and 210° F. Upon discharging the heated mixture into the vapor separating chamber 77, water and other vaporizable impurities are withdrawn therefrom to form a partially or substantially completely dehydrated mixture. If a substantially completely dehydrated mixture is found desirable for a given oil, the employment of concentrated solutions or slurries in the mixer 69 reduces the amount of water removed in the vapor separating chamber. Even dry soda ash or other non-saponifying agent may sometimes be employed. Any carbon dioxide formed as a result of admixing soda ash with the oil is withdrawn from the mixture even if dry soda ash is employed and, if neutralization of the oil has not been completed in the receptacle 69, substantially complete neutralization is effected in the vapor separating chamber 77.

The treatment of the mixture of oil and soap stock in the chamber 77 appears to modify the nature of the soap stock so that better separation may be accomplished in the separator 96, and this is particularly true if the treatment therein is sufficiently drastic that at least a substantial portion of the water is withdrawn and the mixture then rehydrated. Also, other vaporizable impurities are withdrawn from the oil so that oil of better flavor and odor is produced. Furthermore, the treatment in the chamber 77 usually causes a somewhat greater color reduction of the oil and produces an oil which is more easily bleached.

In the process above described employing non-saponifying alkalies, substantially no neutral oil is lost by saponification thereof. The non-saponifying neutralizing agents do not attack the oil and, even though caustic alkalies are employed in the color reducing step, the small amount and the short time of contact with the oil, as well as the efficient separation obtainable in the absence of soap stock, enables color reduction to be carried on with no substantial saponification of neutral oil. The losses during the color reduction step are usually not greater than $\frac{1}{10}$ of 1%. The losses in the neutralizing step are due substantially entirely to entrainment of neutral oil in the soap stock and are usually less than half those ordinarily encountered in the best prior processes. All of the steps of the process may be rapidly performed so that the oil is not subjected to high temperatures for extended periods of time.

It is apparent that the continuous step of mixing oil and neutralizing agent shown in Figure 1 may be employed with the dehydration step of Figure 2 and that the batch mixing step of Figure 2 may be employed with non-saponifying alkalies instead of the continuous mixing step of Figure 1, so that a body of oil may be admixed with neutralizing agent in a mixing receptacle 69, the agitation continued at a rate just sufficient to prevent stratification of the mixture and a stream of the mixture withdrawn and delivered directly to a centrifugal separator for separating the soap stock from the oil. In the latter case, and when employing soda ash, it is usually necessary to admix a large excess of soda ash with the oil in the mixing receptacle, for example, at least three to five times that necessary to neutralize the free fatty acids, in order to prevent the formation of carbon dioxide which would interfere with continuous centrifugal separation of the soap stock from the oil. All of the soda ash solution necessary for effective separation may be added in the mixing receptacle or a part thereof added in flow. The concentrations of the various solutions added may vary in the same manner as described with reference to the continuous mixing step.

The dehydration vapor and gas separation step shown in Figure 2 is particularly adaptable to refining oils containing oil solvents, as such solvents are removed from the oil in the vacuum chamber 77. Thus, such solvents as hexane, benzene, gasoline, benzol and other petroleum solvents employed to extract the oil from the seeds may be present in the oil so that it is unnecessary to remove the same prior to refining. The presence of such solvents is often desirable, as the solvent vapors separated from the oil assist in removing vaporizable impurities from the oil and if caustic alkalies are employed for neutralization such solvents inhibit saponification of neutral oil thereby. It is, therefore, sometimes desirable to add such solvents even if not originally present in the oil. Also, other vaporizable materials such as ethyl or isopropyl alcohol, or other fatty acid or soap solvents, may be added to the oil either alone or in combination with the petroleum solvents above referred to. Such solvents also inhibit saponification of caustic alkalies. The various solvents appear to modify the nature of the gums and soap stock so that more effective separation is accomplished in the separator 96. The solvents removed in the vacuum chamber may be recovered by condensing the vapor thereof and may be again used in the process.

Instead of employing a separate color reduction step such as that disclosed in Figure 1 when non-saponifying neutralizing agents are employed, it is sometimes possible to secure sufficient color reduction of the oil by adding a small amount of caustic alkali solution to the oil and soap stock mixture prior to the separation of the soap stock from the oil. Thus the mixer 22 of Figure 1 and the mixer 94 of Figure 2 may be employed for this purpose. A small amount of caustic alkali solution may thus be added alone or in admixture with soda ash or other diluting solution. Thus with certain oils, even when employing non-saponifying agents for neutralization, the subsequent color reduction step may be eliminated, without substantial increase of refining losses even though the oil being refined is rather highly colored, by adding caustic alkali after neutralization but before separation of the soap stock.

It is also possible to admix a small amount of caustic alkali such as caustic soda with the soda ash solution initially admixed with the oil so that less soda ash solution is necessary to neutralize the free fatty acids while preventing the formation of carbon dioxide. This operation is particularly useful when refining oils containing large amounts of free fatty acids. If the amount of caustic alkali thus added is not greater than that necessary to neutralize the free fatty acids in the oil, no saponification of neutral oil takes place during the neutralizing step. Just sufficient caustic alkali solution to neutralize the free fatty acids may also be employed as the neutralizing agent in the absence of soda ash, even when the mixture is dehydrated, without materially increasing refining losses if sufficient soda ash or equivalent soap stock softening solution is added prior to separation to soften the soap stock and provide effective separation.

The process of the present invention has been particularly described with reference to the employment of soda ash solutions, since such solutions, if employed in sufficient amount and of proper concentration, effectively soften the soap stock and produce an extremely liquid soap stock. Also, such soda ash solutions effectively drive the oil out of the soap stock phase so that very little oil is retained in the soap stock. However, other non-saponifying neutralizing agents such as trisodium phosphate, disodium phosphate, sodium silicate, equivalent potassium salts and other alkaline salts of alkali earth metals are also effective. Also, amines such as ammonia, triethanalamine, etc., may be employed as neutralizing agents in any process not involving dehydration, as they also produce softened soap stock and do not saponify neutral oil. It is not necessary that all of the agent present during separation be basic in nature, as certain substantially neutral salts such as sodium sulfate, sodium thiosulfate, sodium thiocyanate, etc., and equivalent potassium, ammonium and alkali earth metal salts which also soften the soap stock may be substituted in part for the soda ash or other neutralizing agent, so long as sufficient neutralizing agent is present to substantially completely neutralize the free fatty acids. The equivalent potassium salts are usually even more effective than sodium salts but are relatively expensive. Even a small amount of acidic materials such as naphthenic acid which react with alkalies to form very liquid soaps may be employed. Abietic acids, such as those found in rosin, may also be employed for the same purpose. The resulting solutions of salts of these acids function as soap stock softening agents and reduce the amount of other solutions such as soda ash necessary for effective separation. The acids may also be converted into soap prior to introduction into the process. The acids or soaps may be added prior or after neutralization of the soap or may be added with the neutralizing agent. Small amounts, for example, 1 to 3% of the naphthenic acid or rosin relative to the weight of the soap stock, are usually sufficient for effective separation even in the absence of substantial excesses of soda ash or other non-saponifying alkalies. The salts of these acids, particularly the rosin soap, have the advantage of increasing the value of the soap stock over soap stocks containing large amounts of salts other than soap. Sufficient neutralizing agent should be employed to neutralize the free fatty acids or any other acidic material present.

Potassium soaps are usually more liquid than sodium soaps, and it is many times advantageous to have such soaps present during separation. This can be accomplished by substituting potassium carbonate for a part or all of the sodium carbonate as the neutralizing agent. Potassium hydroxide can also be substituted for caustic soda wherever caustic soda is disclosed herein. Also, a potassium soap solution may be added as a rehydrating or soap stock softening solution. Certain other bases such as urea also produce very liquid soaps and can be employed as neutralizing agents either alone or in combination with other agents to soften the soap stock, or soaps of urea or similar bases may be added either before or after neutralization as a soap stock softening agent. In many cases, however, the soap stock softening agent may consist in whole or in part of substantially neutral salts which have a softening effect upon the soap stock. Various mixtures of such salts, other soap stock softening agents and neutralizing agents may be present during centrifugal separation so long as the amount and concentration of the solution is sufficient to produce a liquid soap stock containing very little neutral oil. The amount and concentration of such solutions will vary with different oils and agents employed but will usually fall within the range of concentrations and amounts given with respect to soda ash solutions. The employment of such soap stock softening agents in relatively large amounts is particularly important when refining oils such as palm oils, which form soaps which are hard and relatively insoluble. With some oils it is sometimes possible to employ relatively large amounts of water alone as the diluting agent. Certain salts, for example, chlorides such as sodium chloride, are not effective to produce the improved separation of the present invention, as they harden instead of soften the soap stock.

While continuous centrifugal separation produces much better results than settling operations, improved results over prior batch processes are obtained by employing large amounts of solutions of the non-saponifying neutralizing agents, salt solutions, or other soap stock softening agents, above discussed during a batch settling operation. The soap stock layer is more compact and contains less neutral oil and there is a sharp line of division between the oil and the soap stock after settling. The amounts and concentrations of neutralizing agents and other agents given with respect to continuous centrifugal separation are usually effective for batch settling operations. Thus continuous mixing of the neutralizing agent may be combined with a batch settling operation, a batch mixing operation may be combined with a continuous centrifugal separation, or both separation and mixing may be continuous or batch. Color reduction and separation of color impurities as well as washing and drying may also be continuous or batch. In fact, an entire refining operation, including mixing, dehydrating, rehydrating or diluting, soap stock separating, color reduction and washing and drying, or any selected number of these steps may be carried out in a single kettle if desired. The soap stock softening agents of the present invention are particularly desirable when alkali refining oil which has already been degummed. The soap stock-oil mixture has a tendency to stratify into three layers either in a centrifugal or settling step, that is to say, into an oil layer, a layer containing a mixture of oil and soap, and a soap layer, so that either the separated oil contains substantial amounts of soap or the separated soap stock contains large amounts of oil. The softening agents prevent this stratification. The dehydration treatment also aids in preventing this stratification.

In any case, the employment of large amounts of non-saponifying neutralizing agents during separation, or the employment of diluting or soap stock softening agents mentioned herein, results in a more complete separation of the oil from the soap stock. When non-saponifying neutralizing agents are employed, there is substantially no loss arising from saponification of neutral oil. Color reduction steps performed on the oil from which the soap stock has been removed also produce negligible refining losses. The large amount of solutions present during soap stock separating and the washing step remove substantial amounts of color impurities even if no caustic alkalies or separate color reduction step is employed. The oil resulting from the process is of high quality and, if desired, of low color. One of the major advantages of the present process is its adaptability to substantially all types of vegetable and animal oils. Thus, vegetable oils such as cottonseed, corn, sesame, soya bean, linseed, etc., can be treated. Even tung oil, which is extremely difficult to refine because of emulsion difficulties, may be satisfactorily refined, particularly in a process involving dehydration, as such dehydration completely breaks emulsions formed during neutralization. The vegetable oils may be either crude oils containing gums, or may be so-called degummed oils from which the gummy materials have been previously removed. The term "animal oils" is intended to include fish oils, such as sardine, menhaden, herring, etc.

The employment of the dehydrating step of the present invention, even when caustic alkalies, such as caustic soda, with the conventional large excesses are used as the neutralizing agent, produces improved results. Continuous mixing as disclosed in Figure 1, either with stream preheating to temperatures between 100 to 160° F. or subsequent stream heating, is preferable as the mixture can be delivered into the dehydrating chamber of Figure 2 before substantial saponification of neutral oil takes place. Also, rapid and substantially complete dehydration is also preferred as removal of substantially all of the water prevents or substantially retards further saponification of neutral oil. The dehydrated soap stock can, however, continue to act as a color adsorbing agent in the presence of excess caustic. By rehydrating the mixture and promptly centrifugally separating, a more effective separation can be produced. Thus, both the amount of neutral oil saponified and the amount thereof entrained in the soap stock is reduced. As stated above, the dehydration treatment appears to modify the soap stock so that separation is more easily accomplished and the oil more easily and more completely removed from the soap stock. Any of the solvents above mentioned may be present during the neutralization step to further retard saponification of neutral oil during saponification, and are removed in the dehydrating step for reuse in the process, if desired.

When employing the usual excess of caustic neutralizing agents, water alone may be used as the rehydrating agent and more effective separation secured than when the dehydrating step is omitted. The soap stock softening agents of the present invention, however, improve separation and are many times necessary if amounts of caustic soda chemically equivalent to the free fatty acids are employed. In such cases, the soap stock softening agents may be present during neutralization or added in solution before separation. The interposed dehydration and rehydration steps also have the advantage of making the concentration of the solutions employed for neutralization independent of the separation step. Thus, very dilute solutions can be employed for neutralization for certain oils and separation carried out in the presence of more concentrated solutions.

The dehydration and rehydration steps or the employment of softening agents for the acid foots also reduce refining losses in acid refining processes. Such acid refining processes involve the mixing of solutions of strong mineral acids, such as sulfuric or phosphoric, with the animal or vegetable oils in order to render separable impurities other than free fatty acids. Acid refined oils are chiefly employed in the paint and varnish industries for uses where the presence of free fatty acids is desirable or at least unobjectionable. Such acid refining processes are preferably carried out by employing the continuous mixing steps described with reference to Figure 1. Relatively concentrated solutions are usually employed and the acid will not only cause splitting of the glycerides in the presence of water but will also attack the oil to cause sulfonation, etc., depending upon the acid employed. By rapidly dehydrating the mixture after the acid refining reagent has been mixed therewith, these reactions are arrested and the acid foots rendered more easily separated after rehydration. After again rehydrating the foots, and separating them from the oil, the amount of oil entrained in the foots is reduced over processes in which no dehydration step is employed, so that the dehydration and rehydration steps result in less destruction of neutral oil.

It has also been found that the soap stock softening agents disclosed above are, in general, effective to also soften the acid foots so that even less oil is entrained therein when separated. The foots softening agents are preferably added after dehydration, as a part of the rehydrating agent, but in some cases it has been found desirable to add these agents in part or all prior to dehydration, in which case water or solutions containing less of the agents can be added after dehydration as part of the rehydrating solution. In many cases it is not necessary to completely dehydrate the oil-foots mixture, as improved results are secured by partial dehydration. The softening agents are effective to improve separation even though no dehydration step is employed. By adding the agents in solution, preferably after the acid is added, the mixture may be rapidly and substantially completely separated into oil and foots so that entrainment of oil in the foots is minimized. The softening agents selected for use in acid refining will to some extent be controlled by the reactions which may occur between the acid and the agent as well as the desired properties of the refined oil. If alkaline softening agents are employed, sufficient acid refining agents should be used to combine with the alkali and still leave sufficient acid to render the acid foots separable. The reaction products of the acid and alkali then constitute the softening agents. If carbonates are employed in this manner, it is usually necessary to use a dehydration step and add the carbonates before dehydration in order to remove carbon dioxide and prevent it from interfering with separation. Neutral salts and acidic softening agents above disclosed can be employed without necessitating an increase in the amount of acid refining agent.

The dehydrating step and foots softening agents are also applicable to partial refining or degumming processes employing weak acids or bases or substantially neutral solutions or even water to precipitate foots. Water alone, weak solutions of strong acids or strong alkalies, and more concentrated solutions of weak acids or bases or of substantially neutral salts will render separable impurities generally referred to as gums. A dehydration step, even though water alone is employed to precipitate the gums prior to dehydration, renders the gums more easily separable when again precipitated even though removal of water during dehydration may cause some of the gums to again disperse in the oil. Again, adding water either alone or carrying a softening agent provides an improved separation over that when the dehydration step is omitted. The presence of softening agents during separation further improves the separation so as to reduce the oil entrained in the foots. This is true even if the dehydrating step is omitted. It is apparent that the softening agents employed in degumming processes should be neither strong alkali nor strong acid. However, substantially neutral salts of alkali metals, including the potassium soaps of fatty or other acids, the sodium or potassium soaps of naphthenic or rosin acids, formamide, urea, sodium and ammonium sulphanates, are particularly suitable and solutions thereof are preferably added after the gums have been precipitated and prior to separation.

In connection with the alkali refining of animal and vegetable oils, the dehydration step described makes it possible to employ other methods of separation than those depending upon difference of specific gravity. For example, the soap stock can be filtered out of the oil. This is preferably accomplished by a continuous vacuum filter in which the soap deposited upon the filter member is continuously scraped therefrom. When substantially all of the water has been rapidly withdrawn while the soap stock is suspended in the oil, as is the case in the continuous dehydration step disclosed, the soap stock collecting upon the filter member has a granular or open structure and the oil is more easily withdrawn therefrom. The soap stock after filtration still contains some oil which can be recovered by mixing an oil solvent such as benzene with the dehydrated and filtered soap stock and again filtering. Alternatively, the soap stock can be washed with solvent while on the filter member. It is preferred, however, to continuously scrape the filtered soap stock from the filter member and deliver it to a mixing device concurrently with a stream of solvent, withdrawing a stream of the mixture from the mixer and delivering it to a second continuous filter in which the mixture is continuously separated into a solvent oil phase, and substantially oil free soap stock. The oil can then be freed of solvent by volatilization, for example, by heating a stream of oil-solvent mixture and delivering the heated mixture into a vapor separating chamber such as that shown in Figure 2. The vaporized solvent can then be condensed and reused. A more desirable operation is to return the oil-solvent mixture to the oil to be refined, for example, by proportioning a stream of the same into a stream of the oil prior to mixing the refining reagent therewith or, less desirable, just after mixing the refining reagent with the oil. The solvent is then present during neutralization or immediately thereafter and to inhibit any saponification of neutral oil, the solvent is removed in the dehydration step and may easily be condensed and separated from the water for reuse in removing oil from the filtered soap stock. A similar series of steps can also be employed with respect to dehydrated acid foots filtered from the oil in a manner similar to that described in relation to acid refining. A basket type of centrifugal separator may also be employed for separating foots from a dehydrated mixture and is substantially equivalent to a filter. Provision can be made for continuously removing the foots deposited in the basket, for example, by a scraping mechanism, and the foots can be treated to remove residual oil in the same manner as the foots separated from the oil by filtration. Also, a continuous centrifugal separator can be used to separate the foots from the dehydrated mixture by introducing a stream of water or a solution containing softening agents into the bowl of the separator adjacent the periphery thereof so as to cause the foots to be continuously discharged as a stream without the diluting or softening liquid coming into contact with the oil. Any soap left in the oil can be removed in a subsequent color reduction or washing step.

As stated above, non-saponifying alkalies, particularly soda ash, are the preferred neutralizing said soap stock softening agents for alkali refining. Soda ash not only effects a low loss refining operation but the resulting soap stock is a valuable detergent. The soda ash is less destructive to the gums contained in the oil and stop stock than caustic alkalies, so that a better quality soap stock is produced even when refining undegummed oil. The decomposition products of gummy materials such as proteins and phosphatives are amine-like, evil smelling compounds and are largely avoided when soda ash or other non-saponifying alkalies are employed for refining, particularly when refining is carried on in a quick continuous process. The gums may be separated in substantially undecomposed form from soap stock and recovered as valuable by-products by washing or solvent treatment of the soap stock, although for some detergent purposes it is desirable to leave the gums in the soap stock. When refining degummed oil, a good quality filled soap is directly produced. By controlling the amount of water employed in the rehydrating or soap stock softening agents, a neat soap, i. e. one containing approximately 30% water, can be directly produced so as to be capable of being converted into any type of soap product by known commercial methods. Other types of non-saponifying alkali refining agents or soap stock softening agents which will function as soap fillers may be substituted in part or wholly for the soda ash in the refining process to produce the detergents discussed above.

This application is a continuation in part of my copending applications Serial No. 237,999, filed October 31, 1938; Serial No. 248,329, filed December 29, 1938; Serial No. 249,284, filed January 4, 1939; and Serial No. 265,030, filed March 30, 1939.

While I have described the preferred embodiments of my invention, it is understood that the details thereof may be varied within the scope of the following claims.

I claim:

1. The process of refining animal and vegetable oils which comprises: mixing a refining reagent with said oils to precipitate the foots therein, pumping a stream of a substantially uniform mixture of said oil and foots into a vapor separating zone, heating said stream during said pumping to a temperature sufficient to separate gaseous and vaporizable materials from said mixture in said zone in order to porduce a substantially dehydrated mixture of oil and foots and thereafter separating the dehydrated foots from said oil.

2. The process as defined in claim 1 in which the foots are separated from the oil by subjecting the mixture to continuous filtration.

3. The process as defined in claim 1 in which the foots are separated from the oil by subjecting the mixture to treatment by a continuous vacuum filter.

4. A process of refining animal and vegetable oils which comprises the steps of: continuously mixing a refining reagent with said oils, advancing said mixture under superatmospheric pressure through an elongated heating zone, heating the stream as the same advances through said zone to an extent sufficient to separate the gaseous and vaporizable materials from said mixture when the same are introduced into a vapor separating zone, introducing the mixture to said vapor separating zone and continuously removing the vaporizable materials to produce a substantially dehydrated mixture of oil and foots, continuously withdrawing the dehydrated mixture of oil and foots from said separating zone and continuously separating the dehydrated foots from the oil.

5. The process as defined in claim 4 in which the foots are separated from the oil by continuously subjecting the mixture to a filtration step.

6. The process of refining animal and vegetable oils containing free fatty acids, which comprises: mixing an alkali refining agent with said oils to neutralize said free fatty acids and form soap stock, introducing a stream of the resulting mixture into a vapor separating zone while the temperature of the mixture in said stream is sufficiently high to cause separation of gaseous and vaporizable materials from said mixture, withdrawing gaseous and vaporizable materials from said zone to produce a substantially dehydrated mixture of oil and soap stock. concurrently withdrawing a stream of the dehydrated mixture and separating the dehydrated soap stock from the oil.

7. The process of refining animal and vegetable oils containing free fatty acids, which comprises: mixing an aqueous solution of soda ash with said oils to neutralize said free fatty acids and form soap stock, introducing the stream of the resulting mixture into a vapor separating zone while the temperature of the mixture in said stream is sufficiently high to cause separation of gaseous and vaporizable materials from said mixture, withdrawing gaseous and vaporizable materials from said zone to produce a substantially dehydrated mixture of oil and soap stock. concurrently withdrawing a stream of the dehydrated mixture and separating the dehydrated soap stock from the oil.

8. The process of refining animal and vegetable oils containing free fatty acids, which comprises mixing an alkali refining agent with said oil from which gums have been preliminarily removed to neutralize said free fatty acid and form soap stock, introducing a stream of the resulting mixture into a vapor separating zone while the temperature of the mixture in said stream is sufficiently high to cause separation of gaseous and vaporizable materials from said mixture, withdrawing gaseous and vaporizable materials from said zone to produce a substantially dehydrated mixture of oil and soap stock, concurrently withdrawing a stream of the dehydrated mixture and separating the dehydrated soap stock from the oil.

9. The process of refining animal and vegetable oils containing free fatty acids which comprises: mixing an alkali refining agent with said oil to neutralize said free fatty acids and form soap stock, introducing a stream of the resulting mixture in a vapor separating zone while the temperature of the mixture in said stream is sufficiently high to cause at least partial separation of the gaseous and vaporizable materials from said mixture, withdrawing the gaseous and vaporizable materials from said zone to produce a mixture of at least partially dehydrated oil and soap stock, concurrently withdrawing a stream of said mixture and separating said soap stock from the oil.

10. The process as defined in claim 9 in which the soap stock retains sufficient moisture for effective separation.

11. The process of refining animal and vegetable oils which comprises: mixing a refining reagent with said oils to precipitate foots therein, pumping a stream of a substantially uniform mixture of said oil and foots into a vapor separating zone while at a temperature sufficiently high to at least partially separate the gaseous and vaporizable materials from said mixture in said zone in order to produce an at least partially dehydrated mixture of the oils and foots and thereafter separating the said foots from said oil.

12. The process as defined in claim 11 in which only partial vaporization of the water occurs but wherein a sufficient amount of water is retained by said foots to provide for effective separation of the foots from the oil.

13. The process of refining animal and vegetable oils which comprises: mixing a refining reagent with said oil to precipitate foots therein, pumping a stream of a substantially uniform mixture of said oil and foots into a vapor separating zone while at a temperature sufficiently high to only partially separate the gaseous and vaporizable materials from said mixture in said zone in order to produce a mixture retaining a sufficient amount of water in the foots to provide for effective centrifugal separation of the foots from the oil and centrifugally separating said foots from said oil.

BENJAMIN CLAYTON.